United States Patent [19]

Matthews

[11] 3,988,896
[45] Nov. 2, 1976

[54] GEOTHERMAL ENERGY PUMP AND MONITOR SYSTEM

[75] Inventor: Hugh B. Matthews, Acton, Mass.

[73] Assignee: Sperry Rand Corporation, New York, N.Y.

[22] Filed: May 23, 1975

[21] Appl. No.: 580,384

[52] U.S. Cl. .................................. 60/641; 417/367; 340/18 NC; 340/18 FM
[51] Int. Cl.² ........................................ F03G 7/00
[58] Field of Search .................. 60/641; 417/22, 32, 417/24, 405, 367, 431; 340/18 NC, 18 FM

[56] References Cited
UNITED STATES PATENTS

| | | | |
|---|---|---|---|
| 2,410,973 | 11/1946 | Hoover | 417/367 X |
| 2,961,964 | 11/1960 | Williams et al. | 417/22 X |
| 3,135,211 | 6/1964 | Pezzillo | 417/367 X |
| 3,617,151 | 2/1975 | Jacoby | 60/641 |

*Primary Examiner*—Martin P. Schwadron
*Assistant Examiner*—H. Burks, Sr.
*Attorney, Agent, or Firm*—Howard P. Terry

[57] ABSTRACT

The operation of a geothermal well power-generation system is monitored by sensor, communication, and performance monitoring equipment permanently associated with the operating power generation system. Sensors detect changes in well water temperature, in water pressure below and above the pump, and in pump rotating speed. This data is transmitted by multiplex communication to receiver and utilization means at the earth's surface. A novel permanent magnet generator system supplies the signal representative of pump rotation speed and also supplies electrical power for the multiplex communication of the sensor output signals.

27 Claims, 4 Drawing Figures

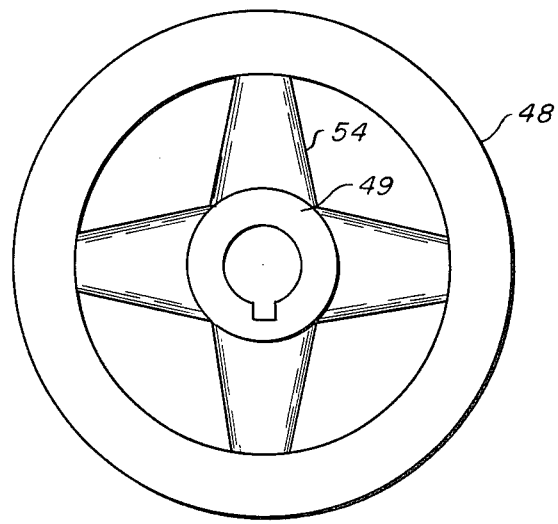
F I G. 3.
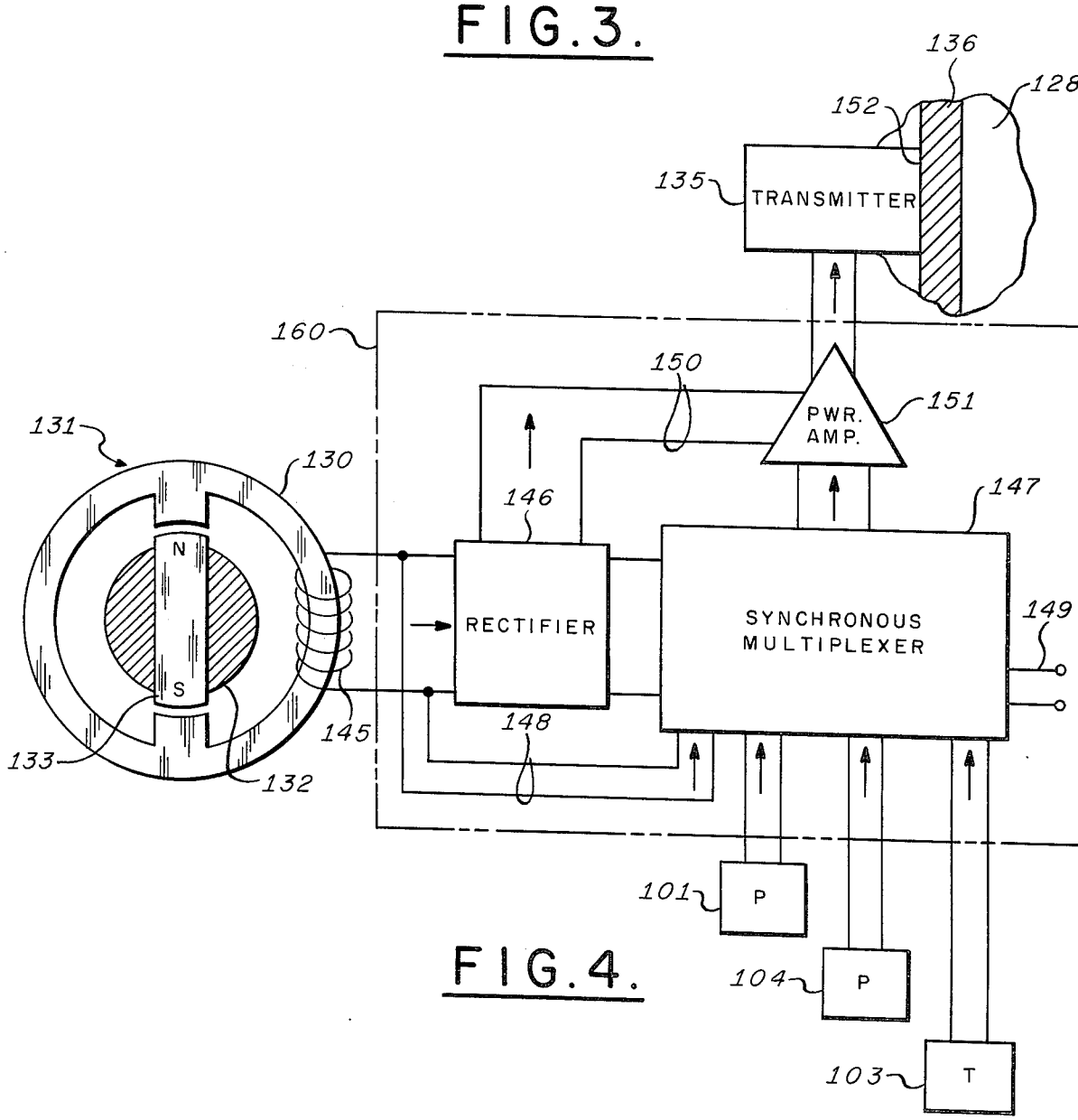
F I G. 4.

GEOTHERMAL ENERGY PUMP AND MONITOR SYSTEM

BACKGROUND OF THE INVENTION

1. Field of the Invention

The invention relates generally to measurement, communication, and performance monitoring apparatus used in the installation and operation of geothermal well power systems of the kind providing for the generation of electrical or other power by utilizing energy from subterranean geothermal sources and, more particularly, relates to arrangements for monitoring the operation of such geothermal power systems including efficient super-heated steam generation and pumping equipment for application within deep hot water wells for the beneficial transfer of thermal energy to the earth's surface.

2. Description of the Prior Art

The present invention is designed for use in operating geothermal well power generation systems of the general kind disclosed in several prior United States patent applications assigned to the Sperry Rand Corporation:

H. B. Matthews — Ser. No. 300,058 for "Geothermal Energy System and Method", filed Oct. 24, 1972 and issued July 23, 1974 as U.S. Pat. No. 3,824,793, H. B. Matthews — Ser. No. 468,130 for "Geothermal Energy System and Method", filed May 8, 1974 and issued Aug. 5, 1975 as U.S. Pat. No. 3,898,020, H. B. Matthews — Ser. No. 487,405 for "Improved Geothermal Energy Control System and Method", filed July 10, 1974 and issued Feb. 17, 1976 as U.S. Pat. No. 3,938,334, H. B. Matthews, K. E. Nichols — Ser. No. 487,429 for "Geothermal Energy System and Control Apparatus", filed July 10, 1974 and issued Oct. 7, 1975 as U.S. Pat. No. 3,910,050, J. L. Lobach — Ser.No. 488,331 for "Geothermal Energy Turbine and Well System", filed July 15, 1974 and issued Sept. 30, 1975 as U.S. Pat. No. 3,908,380, and R. Govindrajan, J. L. Lobach, K. E. Nichols — Ser. No. 488,333 for "Geothermal Energy Pump Thrust Balance Apparatus", filed July 15, 1974 and issued Sept. 16, 1975 as U.S. Pat. No. 3,905,196.

The foregoing disclosures illustrate features of a geothermal energy transfer and utilization system that abstracts thermal energy stored in hot solute-bearing well water to generate steam preferably superheated, from an injected flow of clean water; the superheated steam is then used in operating a turbine-driven pump at the well bottom, pumping the hot solute-bearing water at high pressure and in liquid state to the earth's surface, where transfer of its heat content to a closed-loop boiler-turbine-alternator combination is effected for the generation of electrical or other power. Cooled, clean water is regenerated by the surface-located system for re-injection into the deep well and the residual, concentrated solute-bearing water is pumped back into the earth.

Geothermal wells of this and other types may be logged to a useful extent by methods applied previously in the oil well industry. In such tests, a canister which may contain sensors, a battery, and a recorder is lowered into the well and is then brought back to the earth's surface where the recorded data is retrieved. This time-consuming method is undesirable even in the oil well application, as it is not a real-time method and requires removal of equipment from the well. Where an operating system such as a geothermal well pump is present, removal of the pump system can not be considered on economic grounds and only secondary ways of finding out what is occurring at the deep well pump site are available.

For example, in the aforementioned Matthews et al application Ser. No. 487,429, reliable operation of the system is assured by a control arrangement in which the pressure of clean water entering the subterranean steam generator determines the rate of mass flow through the pump-driving steam turbine and consequently determines the proper pressure of the hot pumped well water. By control of the output pressure of the clean water pump at the earth's surface, the pumped hot well water pressure is determined. The aforementioned arrangement also permits controlled starting and stopping of the deep well pumping apparatus, permitting the bearings thereof to be adequately lubricated at all times. While the arrangement of application Ser. No. 487,429 is particularly advantageous when operated in an established geothermal power system, direct measurements of primary parameters that instantaneously reflect the efficiency of operation of the deep well geothermal pump system are not conveniently provided by it, parameters whose values are particularly of interest during installation and initial operation of the system as well as during its continued operation. When a change in the output characteristics of a pumped well is observed only at the well head, it is difficult or impossible to assign the cause of the change to a particular problem at the deep well pump location, for example. Thus, more direct evidence is needed in addition to control signals of the general type previously available.

SUMMARY OF THE INVENTION

The invention provides means for the continuous and instantaneous monitoring of deep well geothermal energy systems of the general kind described in the aforementioned Matthews U.S. Pat. No. 3,824,793 and in the Matthews application Ser. No. 487,405. In such systems, there is provided an efficient means for the generation of electrical power at the earth's surface, using energy abstracted from a subterranean geothermal source. The apparatus includes means for the efficient and reliable generation of superheated steam and a steam driven pumping system at the hot water well bottom operated for transfer of the hot water to the earth's surface where its energy content is beneficially used for electrical power generation.

In the installation and operation of one or more such geothermal wells at a geothermal site, continuous monitoring and analyzing of the individual wells is desired. Permanently active sensors are required for detecting changes in fluid pressure and temperature that are too small to detect accurately by secondary means. These small changes may develop only over an extended period of time, but may ultimately induce effects of material significance with respect to the life and efficiency of a given deep well pump installation.

The parameters of interest for direct observation according to the present invention include well water pressure and temperature immediately below the pump, the pressure increment across the pump, and the rotation speed of the pump. According to the present invention, means are provided at the deep well pump location for generating electrical signals representative of well water pressure below and above the pump, of well water temperature below the pump, and of the rotational speed of the geothermal pump, these data being communicated to receiver and utilization means disposed at the earth's surface. A novel permanent magnet generator system supplies the signal representative of pump rotation speed, also providing electrical energy for the multiplexing and communication of the muliplexed signals.

BRIEF DESCRIPTION OF THE DRAWINGS

FIG. 3 is a plan view of an element of the FIG. 2 apparatus.

FIG. 4 is a wiring diagram showing electrical features of the apparatus of FIG. 2 and illustrating component circuit elements and their interconnections.

DESCRIPTION OF THE PREFERRED EMBODIMENTS

Figure 1:
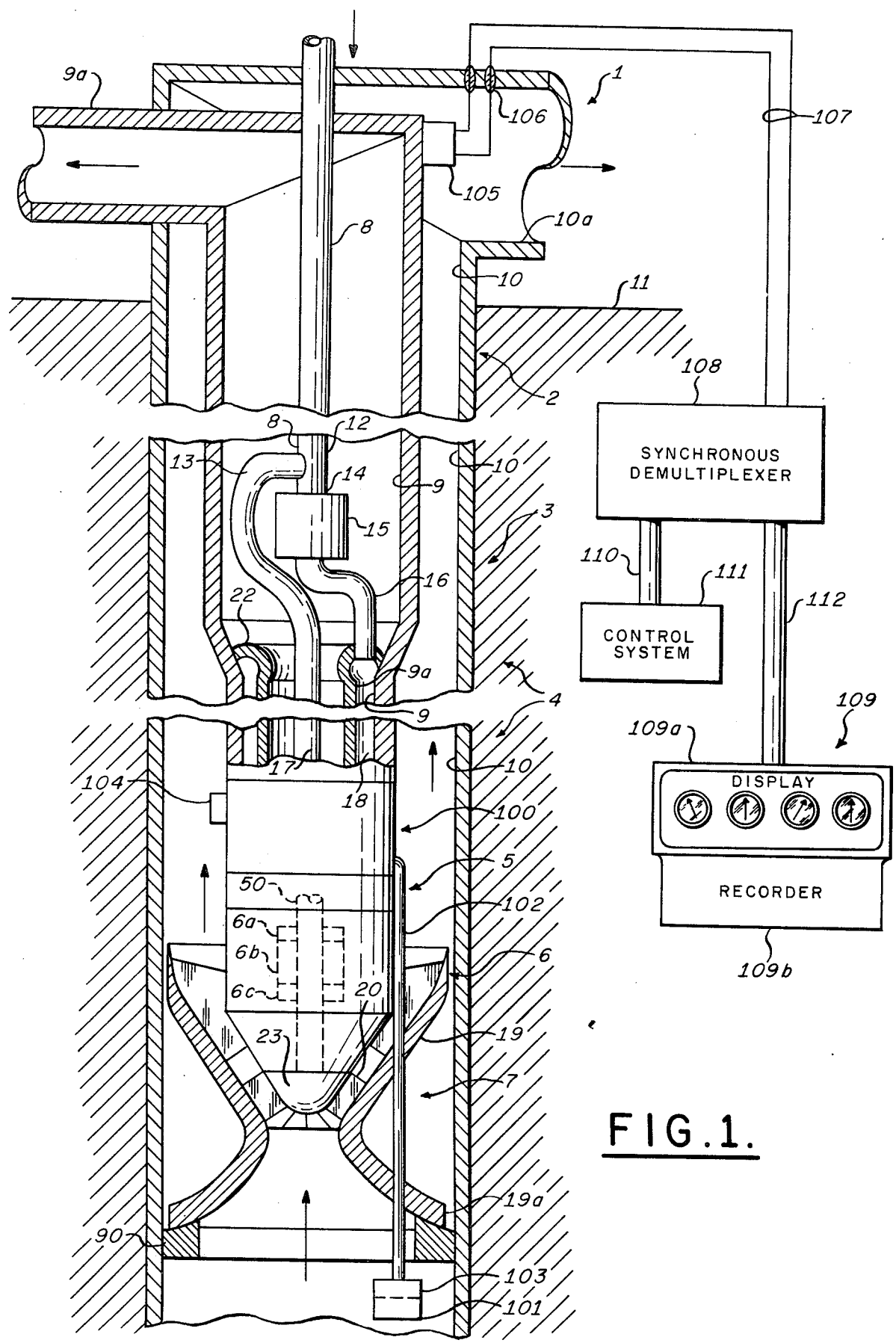
FIG. 1 is an elevation view, mostly in cross section, of the novel deep well geothermal pumping apparatus of the system.

FIG. 1 illustrates the general structure and characteristics of that portion of a novel geothermal energy extraction system immersed in a deep well extending into strata far below the surface of the earth, preferably being located at a depth below the surface such that a copious supply of extremely hot geothermal water under high pressure is naturally available, the active pumping structure being located adjacent the water source and within a generally conventional well casing pipe 10. The configuration in FIG. 1 is seen to include a well head section 1 normally located above the earth's surface 11 and a main well section 2 extending downward from well head section 1 and below the earth's surface 11. At the subterranean source of hot, high pressure water, the main well section 2 joins a steam generator input section 3. The steam generator section 4, the steam turbine section 5, a power plant rotary bearing section 6, and a hot water pumping section 7 follow in close cooperative succession at increasing depths. Interposed between the steam generator section 4 and the steam turbine section 5 is a section including voltage generation, mesurement, and communication elements for facilitating the monitoring function performed according to the present invention, a section identified as the instrumentation section 100 and yet to be described in detail with the aid of FIGS. 2 and 4.

Extending downward from the well head section 1 at the earth's surface 11, the well casing pipe 10 surrounds in preferably concentric relation an innermost stainless steel or other high quality alloy steel pipe or conduit 8 for supplying a flow of relatively cool and relatively pure water from the earth's surface 11 at the bottom of the geothermal well. A second relatively large pipe or conduit 9 surrounding pipe 8 is also provided within well casing 10, extending from well head 1 to the energy conversion and pumping system at the bottom of the well and permitting turbine exhaust steam to flow upward to the surface of the earth.

It will be seen from FIG. 1 that relatively clean and cold water is pumped down the inner pipe 8 from the earth's surface 11 to the region of the pipe tee 12. At tee 12, the downward flowing water is divided between two branch paths. A first branch path feeds clean lubricating water through pipes 13 and 17 for lubricating a system of bearings 6a, 6b, and 6c within the system bearing section 6. The second branch path 14 feeds clean water through pressure regulator system 15 and via distribution pipe or pipes 16 to the input manifold 22 of a steam generator 18 formed between the generally concentric walls of alloy pipes 9 and 9a. Accordingly, high pressure steam is generated and delivered to a steam turbine located within turbine section 5.

The function of the turbine located at section 5 and supported by shaft 50 and bearings 6a, 6b, and 6c located within bearing secton 6 is to drive a hot well water pump located at section 7. Hot, high pressure water is thus impelled upward past seal 90 by the rotating pump vanes 20 between the rotating conical end 23 of the pump and the associated stationary shroud 19a, 19. The hot water is pumped upward at high velocity in the annular conduit between pipes 9 and 10, thus permitting use of the thermal energy it contains at the earth's surface. More important, the hot well water is pumped upward to the earth's surface 11 at a pressure preventing it from flashing into steam and thus undesirably depositing dissolved salts at any point of flashing.

Accordingly, it is seen that the extremely hot, high-pressure geothermal well water is pumped upward, flowing in the annular region defined by alloy pipes 9 and 10. Heat supplied by the hot well water readily converts the clean water flowing into manifold 22 of the steam generator 18 into highly energetic, dry, superheated steam. The clean water, before flowing through tee junction 12 and pressure regulator 15, is maintained at a very high pressure due to its hydrostatic head and to pressure added by a surface pump so that it may not flash into steam. The pressure regulator system 15 controls the pressure of the clean water flowing therethrough so that it may be vaporized and superheated in the volume 18 of the steam generator. The highly energetic steam drives the steam turbine and shaft 50 and is redirected to flow upward to the surface 11 after expansion as relatively cool steam flowing within the annular conduit defined between alloy pipes 8 and 9. Thermal energy is recovered at the earth's surface 11 primarily from the hot, high pressure well water, but may also be retrieved from the turbine exhaust steam.

The elements of the FIG. 1 apparatus so far considered, with the exception of instrumentation section 100, are substantially similar to those of the aforementioned patent applications Ser. Nos. 487,405; 487,429; 488,331, and 488,333 and similar reference numerals are again employed for such similar elements.

According to the present invention, the pump input pressure is measured by a conventional pressure sensor 101 located below the input shroud 19a of the pump, preferably at a location sufficiently below seal 90 to avoid flow disturbances induced by the pump. The measured pressure signals are preferably electrical signals conveyed by conductors in a corrosion immune tube 102 into the instrumentation section 100. Tube 102 or other conventional support elements may be mechanically sufficient to support pressure sensor 101, as well as an associated conventional temperature sensor 103, from which further electrical signals are supplied in a similar manner within instrumentation section 100. A further conventional pressure sensor 104, mounted on pipe 9 or its extensions, as on the outer casing of instrument section 100, is used to provide electrical signals within instrumentation section 100 representing the magnitude of the pressure of the pumped well water between pipes 9 and 10 at a convenient location above the exhaust of pump section 7. Further signals representative of the rate of rotation of the pump shaft 50 and therefore of the turbine and geothermal fluid pump are generated by a permanent magnet machine coupled to shaft 50, as will be further described in connection with FIGS. 2 and 4.

The two pressure representative signals, the temperature signal, and the shaft speed signal are processed in a manner to be described with reference to FIG. 4 within the instrumentation section 100, wherein multiplexed signals are generated for propagation toward the earth's surface 11. Acoustic or electric signals may thus be received at the earth's surface 11 for use in apparatus for display, recording or control purposes.

In the system of FIG. 1, the data is transmitted, for example, by launching coded sound waves in pipe 9 at the instrumentation section 100. In the representative FIG. 1 arrangement, coded sound waves travel in pipe 9 upward from section 100 through sections 4, 3, 2, and 1, where they are received by a conventional sonic receiver transducer 105, there to be converted in the usual manner into coded electrical signals; the latter are coupled, for example, by electrical leads or a coaxial line 107 through seal 106 to demultiplexer 108. Device 108 is a conventional kind of synchronous demultiplexer operated synchronously with respect to the operation of the multiplexer of instrumentation section 100 by virtue of the periodic transmission of a synchronizing signal by the latter and its automatic use by demultiplexer 108. The newly separated signals are then coupled from demultiplexer 108 via cable 112 for presentation in any suitable conventional display 109, as upon individual electrical meters of the meter array 109a. They may additionally or separately be recorded in a conventional multichannel recorder 109b. It will further be understood by those skilled in the art that selected ones of the demultiplexed signals may be used for control purposes as indicated in FIG. 1 wherein they may be selectively supplied by cable 110 to a control or assembly of controls represented by control system 111. By way of example, such signals may be used to operate or to augment the operation of efficient power control apparatus such as described in the aforementioned U.S. Pat. No. 3,824,793.

Figure 2:
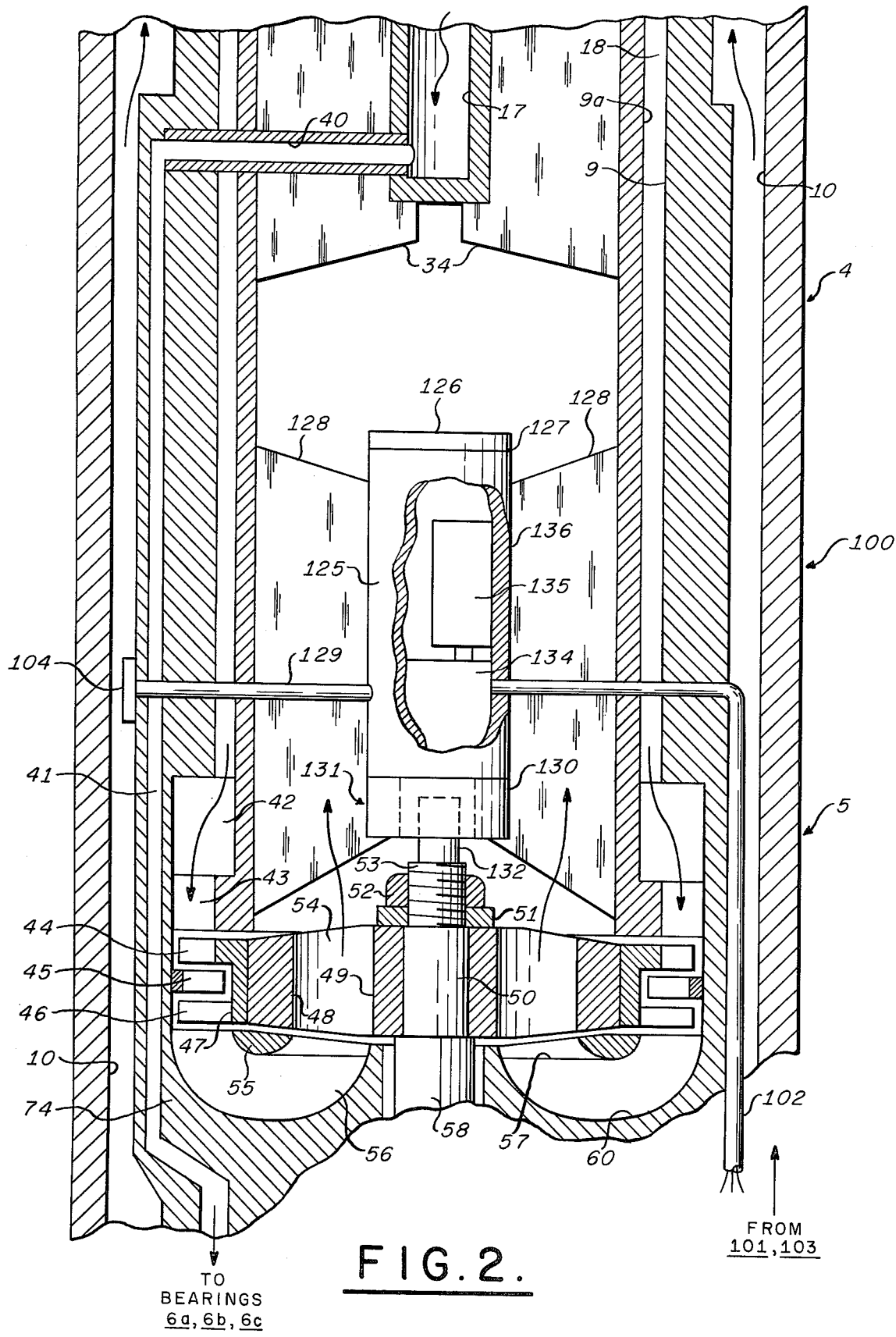
FIG. 2 is a detailed elevation view in cross section showing the location of certain portions of the apparatus of the present invention, the view corresponding to a part of the drawing of FIG. 1.

The apparatus of the instrumentation system 100 will be understood with respect to FIG. 2 illustrating in more detail a portion of the steam generator section 4 and of the steam turbine section 5 in association therewith. As previously noted, the several conduits of section 3 extend into the steam generator section 4 and then through the instrumentation section 100. For example, the pumped hot well water passage is located between pipes 9 and 10, while opposed surfaces of pipes 9 and 9a define the down-flowing steam output passage 18 from the steam generator 18. Between pipes 9a and 17 is the passage for upward flowing exhaust steam from the turbine. The pipe 17 is effectively extended to permit downward flow of clean water into and past the steam turbine section 5 via the channels 40 and 41. It is seen that a series of radial spaced vanes 34 welded between pipes 9a and 17 provides a supporting function; within the exhaust steam chamber, they additionally tend to redirect the rising exhaust steam so that it flows in a vertical direction without any substantial rotational motion.

For operating the steam turbine of FIG. 2, the steam from the steam generator 18 between pipes 9 and 9a is injected into an annular manifold 42, from whence it flows into an array of conventional steam injection nozzles at 43 of generally conventional design. The nozzles 43 are employed in the conventional manner to direct the high velocity steam against the blades at 44, 46 of the turbine stages.

Single or multiple stage turbine blade systems of various known types may be employed in the system. However, for purposes of illustration, a multiple stage arrangement is presented, first and second stages being provided by respective pluralities 44 and 46 of vanes which project in circular arrays from the circular base ring 47. The rotor arrays of vanes 44 and 46 cooperate with an intermediately located conventional array 45 of stator vanes affixed to the body block 74 common to the turbine section 5 and bearing section 6. The ring 47 bearing the vane arrays 44 and 46 is affixed in a conventional manner to a wheel rim 48. Rim 48 is part of a wheel additionally provided with a set of spokes 54 and a hub 49 as seen in FIG. 3. Hub 49, when the rotor system is rotating, causes shaft portions 50 and 58 also to rotate, the hub 49 being securely fastened on shaft portion 50 by washer 51 and nut 52 secured on the threaded extension 53 of shaft portion 50.

A feature of the apparatus permitting compactness of design is concerned with the disposal of expanded steam which has yielded useful energy to the turbine rotor; the feature solves the particular problem of redirecting the exhaust steam without the requirement of space consuming elements. For this purpose, the turbine body block 74 contains an annular smoothly curved toroidal passageway 56 which redirects steam issuing from the rotary vane array 46 radially inward towards shaft portion 58, at the same time altering its direction so that the steam is caused to flow upwardly. The annular passageway 56 is defined by a suitably curved surface 60 cast within the body block 74 and by the surface of the opposed annular ring or guide 55. Ring guide 55 may be supported by an array of radially extending vanes 57, which, in addition to supporting the ring guide annulus 55 with respect to turbine body block 74, also tend to redirect the exhaust steam so that its velocity is primarily vertical, rotational components of motion being reduced in amplitude. Accordingly, it is seen that there is formed a smooth-sided toroidal steam expanding passageway directing the steam after it exits the annular vane array 46 until it passes again through the turbine wheel.

The passage of steam through the latter is particularly facilitated by arranging the spokes 54 of the turbine wheel as illustrated particularly in FIG. 3 so that the steam passes through the wheel, in essence, as if the spokes 54 were not present. The spokes 54 are individually tilted with respect to the direction of the rotation of rim 48 so that their effect at the selected operating rotational speed of the rotor is entirely neutral. In fact, spokes 54 are shaped and are provided with an angle of incidence with respect to the direction of steam flow so that they desirably neither add energy nor subtract energy from the upward flowing steam. Further, steam passages outside of the periphery of the rotating element of the steam turbine are not required and the resultant blocking of the flow of the pumped hot well water is avoided.

With respect to the instrumentation section 100 of FIG. 2, it includes the axially mounted instrumentation container 125 which may be supported by an array of radial vanes 128 from the interior of pipe 9a, the container 125 being hermetically sealed at seal 127 at a convenient internal pressure when its contents are installed and lid 126 is closed. The aforementioned protective tube 102 from sensors 101 and 103 passes through pipes 9 and 9a into container 125; likewise, a similar corrosion immune protective tube 129 shields electrical conductors from sensor 104 so that they may pass through pipes 9 and 9a into container 125.

The base of container 125 directly supports the wound stator 130 of a conventional permanent magnet alternating current generator 131. The rotor 132 is an extension of shaft 50 and shaft portion 132 bearing a diametrically disposed permanent magnet 133 as seen in FIG. 4. There are no physical connections between rotor 132 and stator 130, the rotor 132 being supported only by shaft 50 and thus by bearings 6a, 6b, and 6c supporting shaft 50. Shaft 50, as is also disclosed in detail in the aforementioned patent applications, is journalled by a pair of radial bearings 6a and 6c and by thrust bearing 6b, so that the position of rotor 132 with respect to stator 130 is safely determined even though provision may be made in the bearing support system for any slight axial motion of shaft portion 50 attendant starting or stopping of the apparatus, for example. A further benefit lies in the fact that the wound stator 130 is attached to the stationary instrumentation container 125 so that the use of slip rings is avoided. Generator 131 is essentially a conventional device, and materials for constructing it are selected from known materials in view of its operation in the clean and relatively cool atmosphere of the turbine exhaust steam which will normally penetrate the space between its rotor 132 and stator 130. Since rotor 132 is directly driven at a high speed of the order of 20,000 revolutions per minute, for example, it will be readily apparent that an output signal of useful voltage and power level is easily produced, the output having a frequency that is a direct function of turbine and pump speed.

Container 125 additionally performs the role of protecting certain circuits from damage by the exhaust steam surrounding it, such circuits being disposed on or in circuit support element or chassis 134, as will be described in relation to FIG. 4. The container 125 may use an atmosphere of hydrogen for cooling active elements therewithin. The multiplexed output of chassis 134 is a conventional coded representation of the data to be transmitted to the earth's surface and is applied to a conventional sonic transducer 135. The consequent sound impulses or coded signals are coupled directly to wall 136 of container 125, through vane or vanes 128 into pipe 9a and then, as in FIG. 1, up through pipes 9a and 9 to the sonic receiver 105. Accordingly, it is seen that the radial vanes 128 serve to support container 125 and as part of the sonic energy transmission path; in addition, the vanes 128, like vanes 34, serve to reduce rotation of the exhaust steam, converting rotational energy into the more desirable translational kinetic energy.

FIG. 4 illustrates schematically the permanent magnet alternator 131 with its independently mounted stator 130 and rotor 132, the latter including the diametrically disposed permanent magnet 133. Generator 131 produces an alternating voltage in its output winding 145 whose cyclic frequency is proportional to that of the rotating pump of FIGS. 1 and 2. This cyclic frequency is applied as one input via leads 148 to input terminals of the synchronous multiplexer 147. In a similar manner, the outputs of sensors 101, 103, and 104 are applied to other corresponding pairs of inputs of synchronous multiplexer 147. Additional sensors may be coupled to still further inputs of multiplexer 147, such as at terminal 149.

After synchronous multiplexing in a conventional manner in device 147, the coded representations of the sensed signals may be applied by power amplifier 151, if desired, before application to the sonic transmitter transducer 135 for launching acoustic signals as compression, shear, or other waves for propagation in wall portion 136 which then propagate into vane 128 and up pipe 9a to the sonic receiver transducer 105 of FIG. 1, as previously discussed. It will be understood that one face of transducer 152 is formed in a conventional manner to fit the inner contour of the instrumentation container 125 and that well known means are employed at interface 152 for effecting impedance matching thereat for the efficient transfer of sonic energy across interface 152.

In addition to supplying the rotational speed signal for the multiplexer input leads 148, generator 130 is conveniently used as a source of electrical power for operating the vacuum tube or semiconductor circuits of which the conventional synchronous multiplexer 147 is composed. For this purpose, the alternating voltage induced across winding 145 is amplified in rectifier 146, if necessary, and is coupled after rectification into multiplexer 147 and is also used to power the amplifier 151, if amplifier 151 is required. Energy developed by generator 131 may be used to operate a conventional positive heat pump means (not shown) for withdrawing heat from the support 160 for at least one of circuits 146, 147, and 151.

The general operation of the geothermal well system will be apparent from the foregoing description. It is seen that the geothermal energy well system consists of a deeply submerged superheated steam generation section 4, a turbine section 5 wherein a turbine is driven by the superheated steam, and a hot water pumping section 7 all located at a hot water source where there is present large quantities of hot water which may also include relatively large quantities of dissolved materials. Clean water, formed by condensing the clean steam at the surface, is supplied to the steam generation section 4 for driving the turbine at section 5 and is also reliably supplied to bearings in the turbine and pump sections thereof. The hot water pump section 7 serves to increase the pressure level of the hot water so that it reaches the surface of the earth still well above its saturation pressure.

The pressure of the well water entering the hot water pump is great enough to prevent cavitation damage to the pump and any consequent performance loss in the pump. In general, it is arranged that actual pressures in the hot water are maintained above the flash point by a wide safety margin at all points in the hot water flow system within the well. This is one of the several features of particular importance to the success of the apparatus, since the hot water can not flash into steam when held at all times and locations above its flash pressure. Flashing of the hot water into steam is prevented because it is likely to be disruptive if not actually destructive of equipment and at least will result in the deposition of large amounts of mineral scale in the general location of the flash event. A power system at the surface of the earth readily extracts heat from the extremely hot water for the generation of electrical power or for other useful purposes. What energy remains in the steam used to drive the deep well turbine at section 5 is also returned to the earth's surface for recovery in the surface-located system.

In order to adjust the geothermal well system at the time of its installation for proper and efficient operation at its site and to monitor its subsequent operation so that safe energy production is efficiently maintained, telemetering of performance information from the geothermal pump to the earth's surface is normally required for control or display purposes. Hot water pressures, temperature, and pump rotation rate are representative parameters valuable for assessing productivity of the apparatus or as control terms. For the sake of simplicity, the measured data is communicated by multiplex transmission to the earth's surface using a channel or medium already inherently existing in the deep well apparatus, such as one or more of the several existing concentric pipes of the system with which the pump is associated. To supply power to the necessary deep well sensors, the substantial level of electrical power required is provided by use of a brushless permanent magnet alternator with a rotor supported by the rotating system of the pump and immersed in cooling turbine exhaust steam. The use of seals and brushes is thus desirably avoided. Since the operating parts of the generator are separately suspended, installation of the parts is facilitated during manufacture and the arrangement provides a simple, compact, and reliable solution to the problem of telemetering operational data to the earth's surface, including pump rotation speed.

While the invention has been described in its preferred embodiments, it is to be understood that the words which have been used are words of description rather than of limitation and that changes within the purview of the appended claims may be made without departure from the true scope and spirit of the invention in its broader aspects.

I claim:
1. In geothermal deep well pumping apparatus located at a subterranean source of geothermal well fluid of the kind including geothermal energy exchange means for providing a working fluid and pump means driven by motor means responsive to said working fluid for pumping said geothermal fluid always in liquid state for flow in cooperative energy exchange relation with respect to said geothermal exchange means toward the earth's surface:
   conduit means for passing said working fluid after yielding energy to said motor means as exhaust fluid to the earth's surface,
   alternator means supported within said conduit means comprising alternator rotor means and alternator stator means,
   said alternator rotor means being supported solely by the rotor of said motor means,
   said alternator stator means being supported in cooperative relation about said alternator rotor means from said conduit means,
   said alternator stator means and said alternator rotor means being so cooperatively disposed that the space therebetween is occupied by a portion of said exhaust fluid.

2. Apparatus as described in claim 1 wherein said alternator rotor means comprises permanent-magnet rotor means.

3. Apparatus as described in claim 2 wherein said alternator stator means comprises wound stator means for generating an alternating signal whose frequency is representative of the rate of rotation of said rotor of said motor means.

4. Apparatus as described in claim 3 wherein container means protects from said exhaust fluid transmitter means enclosed therein for transmitting at least a signal representative of said alternating signal frequency to receiver means for exciting utilization means at the earth's surface.

5. Apparatus as described in claim 4 further including:
   first pressure sensor means for providing a first signal representative of the pressure of said geothermal fluid before entry into said pump means,
   second pressure sensor means for providing a second signal representative of the pressure of said geothermal fluid after passage through said pump means, and
   multiplexer means within said instrumentation container means for cooperative multiplexing of said alternating signal and said first and second signals prior to application to said transmitter means.

6. Apparatus as described in claim 5 including rectifier means responsive to said alternating signal for supplying enabling electrical operating power to said multiplexer means.

7. Apparatus as described in claim 6 additionally including:
   temperature sensor means for providing a third signal representative of the temperature of said geothermal fluid before entry into said pump means,
   said multiplexer means being additionally responsive at least to said third signal.

8. Apparatus as described in claim 6 wherein said utilization means comprises demultiplexer means responsive to said receiver means for separate provision of at least said alternating signal, said first signal, and said second signal to multiple channel utilization means.

9. Apparatus as described in claim 8 wherein said multiple channel utilization means comprises display means.

10. Apparatus as described in claim 8 wherein said multiple channel utilization means comprises record storage means.

11. Apparatus as described in claim 6 wherein said utilization means comprises:
   demultiplexer means responsive to said receiver means, and
   control means responsive to said demultiplexer means.

12. In geothermal deep well pumping apparatus located at a subterranean source of geothermal well fluid of the kind including geothermal energy exchange means for providing a working fluid and pump means driven by motor means responsive to said working fluid for pumping said geothermal fluid always in liquid state for flow in cooperative energy exchange relation with respect to said geothermal exchange means toward the earth's surface:
   alternator means comprising alternator rotor means and alternator wound stator means, said alternator rotor means being supported solely by the rotor of said motor means, said alternator wound stator means being supported in cooperative relation about said alternator rotor means in fixed relation with respect to said geothermal energy exchange means for generating an alternating amplitude output signal, rectifier means responsive to said alternating amplitude signal for providing enabling electrical operating power, sensor means responsive to at least one characteristic of said geothermal fluid for providing a first signal, multiplexer means responsive to said enabling electrical operating power for multiplexing at least said alternating amplitude output signal and said first signal, transmitter means responsive to said multiplexer means, receiver means responsive to said transmitter means for exciting utilization means at the earth's surface.

13. Apparatus as described in claim 12 wherein:

said transmitter means includes coupling means for exciting a propagating wave confined with respect to conduit means, and said receiver means includes coupling means for detection of said propagating wave confined with respect to said conduit means.

14. Apparatus as described in claim 13 wherein said conduit means is disposed within said energy exchange means for passing said working fluid after yielding energy to said motor means as exhaust fluid to the earth's surface.

15. Apparatus as described in claim 14 wherein at least said rectifier means, said multiplexer means, and said transmitter means are enclosed by container means having at least a portion of its envelope cooled by said exhaust fluid.

16. Apparatus as described in claim 13 wherein at least said transmitter means is supported by support means additionally for coupling acoustic wave energy generated by said transmitter means into said conduit means for propagation to said receiver means.

17. In apparatus including moving means at an inaccessible location within a bore hole for performing useful work with respect to a medium at said location:

first transducer means having at least first and second relatively movable parts, at least one of said parts being mechanically coupled to said moving means for generating a first electrical signal characteristic of motion of said moving means, second transducer means responsive to a characteristic of said medium adjacent said moving means for generating a second electrical signal, transmitter means utilizing said first electrical signal as enabling electrical operating power for transmitting signals representative of said first and second electrical signals, receiver means responsive to said transmitter means and adapted for exciting utilization means at a location remote from said inaccessible location.

18. Apparatus as described in claim 17 wherein said transmitter means excites waves propagating in a predetermined path with respect to conduit means within said bore hole for receipt by said receiver means.

19. Apparatus as described in claim 18 wherein said predetermined path comprises a sonic wave medium, said transmitter and receiver means respectively including sonic wave transmitter and receiver transducer means.

20. Apparatus as described in claim 17 wherein said transmitter means additionally includes multiplexer means for multiplexing said first and second electrical signals before transmission thereof.

21. Apparatus as described in claim 20 wherein said receiver means includes demultiplexer means for separating said first and second electrical signals and utilization means responsive to said demultiplexer means.

22. Apparatus as described in claim 17 wherein said moving means includes rotor means.

23. Apparatus as described in claim 22 wherein said first part is responsive to said rotor means for exciting within said second part said first electrical signal, said first electrical signal having a frequency characteristic of the rotation rate of said rotor means.

24. Apparatus as described in claim 23 wherein said first part comprises permanent magnet generator rotor means.

25. Apparatus as described in claim 24 wherein said second part comprises generator wound stator means.

26. Apparatus as described in claim 17 wherein said second transducer means comprises temperature sensor means.

27. Apparatus as described in claim 17 wherein said second transducer means comprises pressure sensor means.

* * * * *